United States Patent
Bis et al.

(10) Patent No.: US 10,815,007 B2
(45) Date of Patent: Oct. 27, 2020

(54) METHODS AND SYSTEMS FOR SUPPLYING WATER TO AN AIRCRAFT

(71) Applicant: International Water-Guard Industries Inc., Surrey (CA)

(72) Inventors: Steven Leonard Bis, Langley (CA); Krishnan Ramachandran, New Westminster (CA)

(73) Assignee: INTERNATIONAL WATER-GUARD INDUSTRIES INC., Surrey, B.C. (CA)

( * ) Notice: Subject to any disclaimer, the term of this patent is extended or adjusted under 35 U.S.C. 154(b) by 5 days.

(21) Appl. No.: 16/170,640

(22) Filed: Oct. 25, 2018

(65) Prior Publication Data

US 2019/0127086 A1    May 2, 2019
US 2019/0315488 A2    Oct. 17, 2019

(30) Foreign Application Priority Data

Oct. 27, 2017  (CA) ..................................... 2984308

(51) Int. Cl.
*B64F 1/36*  (2017.01)
*B67D 7/02*  (2010.01)
(Continued)

(52) U.S. Cl.
CPC ................. *B64F 1/36* (2013.01); *B67D 7/02* (2013.01); *B67D 7/302* (2013.01); *C02F 1/008* (2013.01);
(Continued)

(58) Field of Classification Search
CPC ... B64F 1/36; B65B 3/24; B64D 11/02; E03B 11/00; E03B 1/00; E03B 11/10;
(Continued)

(56) References Cited

U.S. PATENT DOCUMENTS 5,261,440 A * 11/1993 Frank ..................... B64D 11/02
                                                      137/208
5,769,124 A *  6/1998 Ehrhardt ................ B64D 11/02
                                                      137/625.47
(Continued)

FOREIGN PATENT DOCUMENTS

DE   102011117234 A1 *  5/2013  ............. B64D 11/02
DE   102011117234 A1     5/2013
(Continued)

OTHER PUBLICATIONS

JP-5834058-B2 English Translation of Specification (Year: 2015).*
(Continued)

*Primary Examiner* — Timothy P. Kelly
*Assistant Examiner* — Stephanie A Shrieves
(74) *Attorney, Agent, or Firm* — Jeffer Mangels Butler & Mitchell LLP; Brennan C. Swain, Esq.

(57) ABSTRACT

There are described methods and systems for supplying water to an aircraft. A water supply assembly is fluidly coupled to a water storage tank via a supply line. An overflow line is fluidly coupled to the water supply assembly. One or more sensors are configured to determine an amount of water in the water storage tank. One or more processors are communicative with the one or more sensors and configured to: determine a desired amount of water to be contained in the water storage tank; determine from the one or more sensors that an amount of water in the water storage tank corresponds to the desired amount of water; and, in response to determining that the amount of water in the water storage tank corresponds to the desired amount of water, transmit an instruction for causing water being supplied from the water supply assembly to the water storage tank to be diverted to the overflow line.

12 Claims, 2 Drawing Sheets

(51) Int. Cl.
- *B67D 7/30* (2010.01)
- *E03B 11/00* (2006.01)
- *E03B 1/00* (2006.01)
- *C02F 1/00* (2006.01)
- *C02F 1/32* (2006.01)
- *E03B 11/10* (2006.01)

(52) U.S. Cl.
CPC .............. *C02F 1/32* (2013.01); *E03B 1/00* (2013.01); *E03B 11/00* (2013.01); *C02F 2201/001* (2013.01); *C02F 2209/005* (2013.01); *E03B 11/10* (2013.01)

(58) Field of Classification Search
CPC .. B67C 3/023; C02F 1/32; C02F 1/008; C02F 2209/005; C02F 2201/001; B67D 7/02
USPC ........................................................ 141/100
See application file for complete search history.

(56) References Cited

U.S. PATENT DOCUMENTS

| | | | |
|---|---|---|---|
| 6,707,048 | B2 | 3/2004 | Hallett et al. |
| 8,674,322 | B2 | 3/2014 | Kohler |
| 8,742,364 | B2 | 6/2014 | Boodaghians et al. |
| 9,260,323 | B2 | 2/2016 | Boodaghians et al. |
| 9,475,582 | B2 | 10/2016 | Mackulin et al. |
| 9,617,171 | B2 | 4/2017 | Rajagopalan et al. |
| 2004/0186634 | A1* | 9/2004 | Lucky ..................... G05D 9/12 701/3 |
| 2007/0142980 | A1* | 6/2007 | Ausman ................. B64C 19/00 701/3 |
| 2008/0095661 | A1 | 4/2008 | Kohler |
| 2009/0045980 | A1* | 2/2009 | Leroy ..................... H04Q 9/00 340/945 |
| 2010/0084030 | A1* | 4/2010 | Mackulin ............... B64D 11/02 137/590.5 |
| 2013/0298998 | A1* | 11/2013 | Nolan .................. B01D 35/027 137/1 |
| 2015/0114912 | A1 | 4/2015 | Taghipour |
| 2015/0144575 | A1 | 5/2015 | Hawkins, II |
| 2015/0314024 | A1 | 11/2015 | Khan et al. |
| 2016/0083272 | A1 | 3/2016 | Rajagopalan et al. |
| 2016/0331855 | A1 | 11/2016 | St Louis et al. |

FOREIGN PATENT DOCUMENTS

| | | |
|---|---|---|
| DE | 102013103517 A1 | 10/2014 |
| JP | 5834058 B2 * | 12/2015 |
| WO | WO 2017/099033 A1 | 6/2017 |

OTHER PUBLICATIONS

DE-102011117234-A1 English Translation of Specification (Year: 2013).*
Office Action issued in Canadian application 2,984,308.

* cited by examiner

METHODS AND SYSTEMS FOR SUPPLYING WATER TO AN AIRCRAFT

FIELD OF THE DISCLOSURE

The present disclosure relates to methods and systems for supplying water to an aircraft.

BACKGROUND TO THE DISCLOSURE

Aircraft generally comprise water storage tanks for storing potable water. The water storage tank is fluidly coupled, via various distribution lines, to outlets on the aircraft so that potable water may be supplied to different points in the aircraft. For example, water is required for making hot beverages that are routinely distributed to the passengers and crew, for use in the lavatories, etc.

Typically, once an aircraft has landed and is parked at the airport gate, the water storage tank will be refilled. This usually involves ground crew connecting a ground water supply to the aircraft water storage tank by means of one or more supply lines. Water from the supply tank is then pumped to the aircraft's water storage tank. The ground crew usually do not know how much water is remaining in the water storage tank prior to refilling. Consequently, aircraft are typically fitted with a drain mast on the underside of the fuselage. The drain mast is fluidly coupled to the water storage tank and receives overflow water once the water storage tank is full. Ground crew will typically refill the storage tank until water is seen to flow out of the aircraft's drain mast. Water exiting the aircraft via the drain mast is a sign to the ground crew that the storage tank is full, and refilling is complete.

Refilling the water storage tank to its maximum capacity usually means that, following the aircraft's next flight, excess water will remain in the tank, since not all the water will have been consumed during the flight. Excess water means that additional fuel is required during the flight, driving up costs. However, if a storage tank is not completely refilled, there is a risk that insufficient water will be supplied to the aircraft prior to its next flight.

The present disclosure seeks to provide improved methods and systems for supplying water to an aircraft, that seek to address at least some of the deficiencies in the prior art.

SUMMARY OF THE DISCLOSURE

In a first aspect of the disclosure, there is provided a method for supplying water to an aircraft. A desired amount of water to be contained in a water storage tank onboard an aircraft is determined. Water is supplied via a supply line to the water storage tank. An amount of water contained in the water storage tank that corresponds to the desired amount of water is determined. In response to determining that the amount of water contained in the water storage tank corresponds to the desired amount of water, the supply of water is diverted away from the water storage tank and to an overflow line.

Prior to determining the desired amount of water to be contained in the water storage tank, a selection of the desired amount of water to be received in the water storage tank may be received. Receiving the selection may comprise receiving a selection of a volume of water to be contained in the water storage tank. Receiving the selection may comprise: receiving a selection of a percentage of a volume of the water storage tank to be filled with water; or receiving a selection of a volume of water to be supplied to the water storage tank.

Supplying water to the water storage tank may comprise supplying water to the water storage tank from a water supply assembly comprising a water supply tank and the supply line.

Diverting the supply of water may comprise activating an overflow valve fluidly coupling the water supply assembly and an overflow line. Diverting the supply of water may comprise moving the overflow valve from a first position, in which water is prevented from flowing between the water supply assembly and the overflow line, to a second position in which water is prevented from flowing between the water supply assembly and the water storage tank.

The aircraft may be determined to be in a pre-takeoff taxi mode. In response to determining that the aircraft is in the pre-takeoff taxi mode, the overflow valve may be moved from the second position to the first position. Determining that the aircraft is in the pre-takeoff taxi mode may comprise determining that a parking brake of the aircraft is deactivated.

Prior to determining the desired amount of water to be contained in the water storage tank, the aircraft may be determined to be in a parked mode. Determining the aircraft is in the parked mode may comprise determining that a parking brake of the aircraft is activated.

Diverting the supply of water may comprise diverting the supply of water away from the water storage tank and to a drain mast of the aircraft, via the overflow line.

Determining the desired amount of water to be contained in the water storage tank may comprise using historical water consumption data.

The water may be treated at one or more points in the supply line.

Determining that the amount of water in the water storage tank corresponds to the desired amount of water may comprise using one or more of: a water level sensor for determining an amount of water contained in the water storage tank; and a flow sensor for determining a rate of flow of water into the water storage tank.

In a further aspect of the disclosures, there is provided a system for supplying water to an aircraft. The system comprises a water supply assembly; a water storage tank fluidly coupled to the water supply assembly; an overflow line fluidly coupled to the water supply assembly; one or more sensors configured to determine an amount of water in the water storage tank; and one or more processors communicative with the one or more sensors. The one or more sensors are configured to determine a desired amount of water to be contained in the water storage tank; determine from the one or more sensors that an amount of water in the water storage tank corresponds to the desired amount of water; and in response to determining that the amount of water in the storage tank corresponds to the desired amount of water, transmit an instruction for causing water being supplied from the water supply assembly to the water storage tank to be diverted away from the water storage tank and to the overflow line.

The system may further comprise a user interface communicative with the one or more processors. The one or more processors may be further configured to receive via the user interface a selection of the desired amount of water to be received in the water storage tank. The selection may comprise a selection of a volume of water to be contained in the storage tank. The selection may comprise: a selection of a percentage of a volume of the water storage tank to be filled with water; or a selection of a volume of water to be supplied to the water storage tank.

The water supply assembly may comprise: a water supply tank; and a supply line fluidly coupling the water supply tank and the water storage tank. The overflow line may be fluidly coupled to the supply line. The system may further comprise an overflow valve fluidly coupling the water supply assembly and the overflow line. The overflow valve may be moveable between a first position in which water is prevented from flowing between the water supply assembly and the overflow line, and a second position in which water is prevented from flowing between the water supply assembly and the water storage tank.

The instruction may comprise an instruction to move the overflow valve from the first position to the second position.

The one or more processors may be further configured to: determine that the aircraft is in a pre-takeoff taxi mode; and in response to determining that the aircraft is in the pre-takeoff taxi mode, transmit an instruction to cause the overflow valve to move from the second position to the first position. The one or more processors may be further configured to determine that the aircraft is in the pre-takeoff taxi mode by determining that a parking brake of the aircraft is deactivated.

The one or more processors may be further configured to determine that the aircraft is in a parked mode. The one or more processors may be further configured to determine that the aircraft is in the parked mode by determining that a parking brake of the aircraft is activated.

The overflow valve may comprise a motorized valve.

The system may further comprise an aircraft drain mast fluidly coupled to the overflow line.

The one or more sensors may comprise at least one of: a water level sensor for determining an amount of water contained in the water storage tank; and a flow sensor for determining a rate of flow of water into the water storage tank.

The one or more processors may be further configured to determine the desired amount of water to be contained in the water storage tank by using historical water usage data.

The system may further comprise a treatment apparatus for treating water at one or more points in the water supply assembly.

In a further aspect of the disclosure, there is provided a non-transitory computer-readable medium having stored thereon computer program code, wherein the computer program code is configured, when executed by a computer, to cause the computer to carry out a method. The method comprises determining a desired amount of water to be contained in a water storage tank; determining an amount of water contained in the water storage tank; determining that the amount of water in the water storage tank corresponds to the desired amount of water; and in response to determining that the amount of water in the water storage tank corresponds to the desired amount of water, transmitting an instruction for causing a supply of water to the water storage tank to be diverted away from the water storage tank and to an overflow line.

Determining the desired amount of water may comprise determining the desired amount of water from a selection of the desired amount of water to be received in the water storage tank. The selection may comprise a selection of a volume of water to be contained in the water storage tank. The selection may comprise: a selection of a percentage of a volume of the water storage tank to be filled with water; or a selection of a volume of water to be supplied to the water storage tank.

Transmitting the instruction may comprise transmitting an instruction for activating an overflow valve fluidly coupling a water supply assembly and the overflow line. Transmitting the instruction may comprise transmitting an instruction for moving the overflow valve from a first position in which water is prevented from flowing between the water supply assembly and the overflow line, to a second position in which water is prevented from flowing between the water supply assembly and the water storage tank.

The method may further comprise: determining that the aircraft is in a pre-takeoff taxi mode; and in response to determining that the aircraft is in the pre-takeoff taxi mode, transmitting an instruction to cause the overflow valve to move from the second position to the first position. Determining that the aircraft is in the pre-takeoff taxi mode may comprise determining that a parking brake of the aircraft if deactivated.

The method may further comprise: prior to determining the desired amount of water to be contained in a water storage tank, determining that the aircraft is in a parked mode. Determining the aircraft is in the parked mode may comprise determining that a parking brake of the aircraft is activated.

Determining the desired amount of water to be contained in the water storage tank may comprise using historical water usage data.

In a further aspect of the disclosure, there is provided a kit of parts comprising: an overflow valve; and instructions for fluidly coupling the overflow valve to a water supply assembly and an overflow line, the water supply assembly comprising a water supply tank fluidly coupled to a supply line fluidly coupled to a water storage tank onboard an aircraft. The overflow valve is moveable between a first position in which water is prevented from flowing between the water supply assembly and the overflow line, and a second position in which water is prevented from flowing between the water supply assembly and the water storage tank.

The instructions may further be for coupling the overflow valve to the supply line.

BRIEF DESCRIPTION OF THE DRAWINGS

Specific embodiments of the disclosure will now be described in connection with the accompanying drawings, of which.

DETAILED DESCRIPTION OF SPECIFIC EMBODIMENTS

The present disclosure seeks to provide improved methods and systems for supplying water to an aircraft. While various embodiments of the disclosure are described below, the disclosure is not limited to these embodiments, and variations of these embodiments may well fall within the scope of the disclosure which is to be limited only by the appended claims.

In the present disclosure, unless the context clearly indicates otherwise:

(a) Directional terms such as "top", "bottom", "upwards", "downwards", "vertically", and "laterally" are used for the purpose of providing relative reference only, and are not intended to suggest any limitations on how any article is to be positioned during use, or to be mounted in an assembly or relative to an environment.

(b) The term "couple" and variants of it such as "coupled", "couples", and "coupling" are intended to include indirect and direct connections. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

(c) The singular forms "a", "an", and "the" are intended to include the plural forms as well.

(d) When used in conjunction with a numerical value, the words "about" and "approximately" mean within +1-10% of that numerical value, unless the context indicates otherwise.

Figure 1:
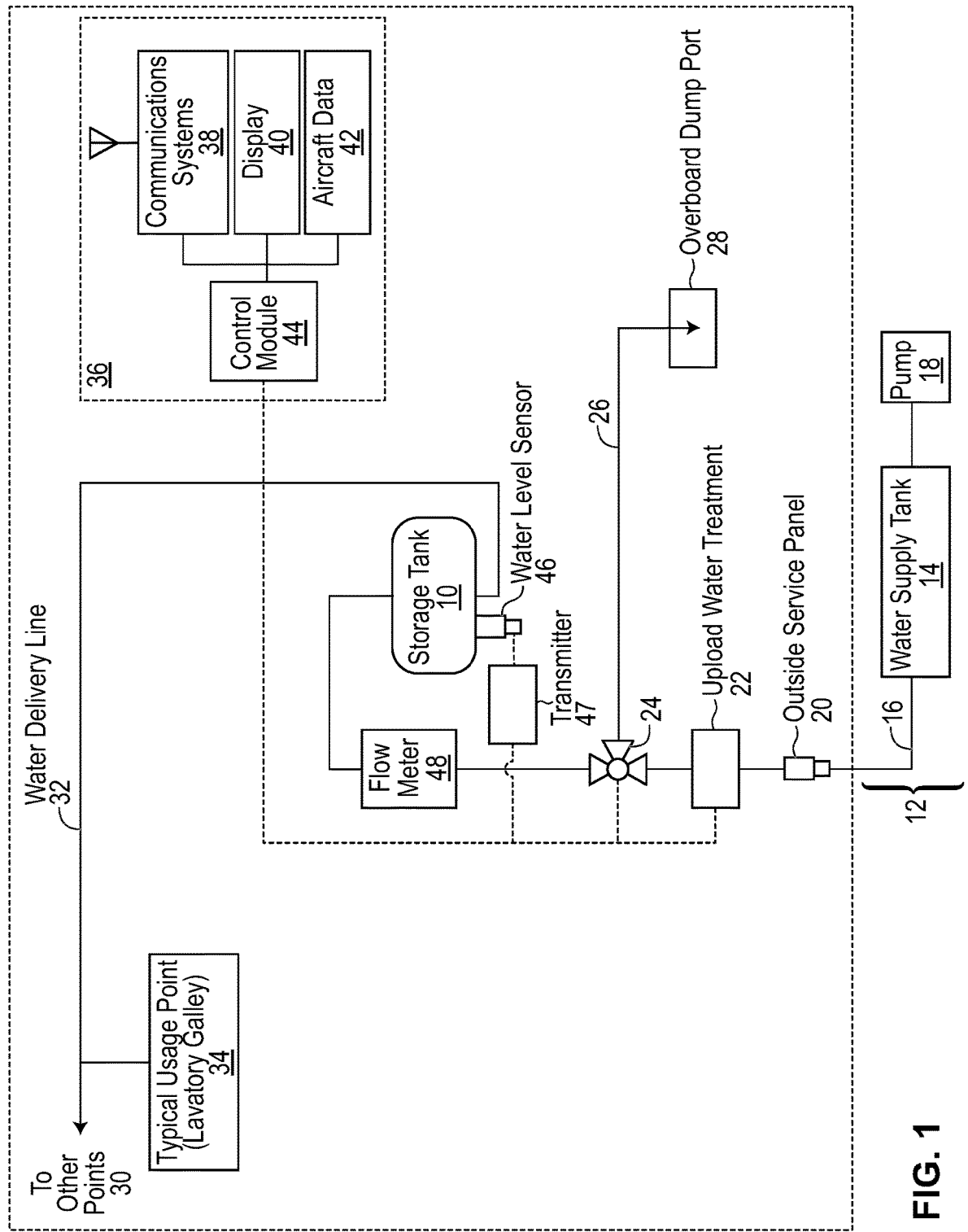
FIG. 1 is a schematic diagram of a system for supplying water to an aircraft, in accordance with an embodiment of the disclosure.

Turning to FIG. 1, there is shown an embodiment of a resupply system for supplying water to an aircraft. The resupply system comprises a water storage tank 10 fluidly coupled to a water supply assembly 12. Water supply assembly 12 comprises a water supply tank 14, a supply line 16 fluidly coupled to water supply tank 14, and a pump 18 operable to pump water stored in water supply tank 14 through supply line 16.

Supply line 16 extends from water supply tank 14 to water storage tank 10, thereby fluidly coupling water supply tank 14 and water storage tank 10. Supply line 16 passes through a potable water service panel 20 and is further fluidly coupled to an upload water treatment assembly 22. Upload water treatment assembly 22 comprises means for treating water as it passes through supply line 16. For example, upload water treatment assembly 22 may include an ultraviolet radiation emitter for treating water as it passes through supply line 16.

Supply line 16 is further fluidly coupled to an overflow valve 24. Overflow valve 24 is fluidly coupled to an overboard dump port 28, such as an aircraft drain mast, via an overflow line 26. Overflow valve 24 is furthermore fluidly coupled to water storage tank 10. Overflow valve 24 is moveable between a first, resupply position in which water is prevented from flowing between supply line 16 and overflow line 26, and a second, overflow position in which water is prevented from flowing between supply line 16 and water storage tank 10.

Water storage tank 10 is further fluidly coupled to various usage points 30 onboard the aircraft, via a water delivery line 32. For example, water contained in water storage tank 10 may be delivered by an onboard pump to a lavatory galley 34 connected in parallel to water delivery line 32. Alternatively, the water may be delivered in-flight to lavatory galley 34 using the aircraft's pressurization system to generate a pressure differential.

FIG. 1 further shows in schematic form a water resupply control assembly 36. Control assembly 36 comprises a communications system 38, a display 40 and an aircraft data database 42, each communicatively coupled to a control module 44. Aircraft data database 42 stores data such as fill level data prior to takeoff and landing, as well as water consumption data. In particular, aircraft data database 42 stores readings of the level of water held in water storage tank 10 before both takeoff and landing. Communications system 38 is configured to communicate (for example over a WiFi network or a GSM network) with other electronic devices for transferring water consumption data. For example, water consumption data may be transferred from aircraft data database 42 to a ground-based receiver, using communications system 38. The water consumption data may be used by an airline, for example, to establish likely water consumption for given flight. The likely water consumption may then be provided to an aircraft's crew prior to takeoff, so that the aircraft's crew may enter an appropriate fill level (see below) when the water resupply method described herein is carried out.

Control module 44 comprises one or more processors communicatively coupled to computer memory having computer program code stored thereon. The computer program code is configured, when read by the one or more processors, to carry out any of the methods described herein. Control module 44 is further configured to receive data from communications system 38 and aircraft data database 40, and cause data to be displayed on display 40. Input received at display 40 (for example via a touch-sensitive user interface) is received at control module 44.

Control module 44 is communicatively coupled to overflow valve 24. In particular, control module 44 is operable to transmit an instruction to overflow valve 24 to cause overflow valve 24 to move between the supply and overflow positions. In one embodiment, overflow valve 24 is a motorized valve operable to activate upon receipt of an instruction from control module 44, the instruction being configured to cause a motor of overflow valve 24 to operate. In some embodiments, control module 44 is configured to communicate with a universal remote control (URC) provided on upload water treatment assembly 22. The URC may receive an instruction from control module 44 to activate overflow valve 24, and in response the URC may send an instruction to cause overflow valve 24 to move between the supply and overflow positions.

Control module 44 is further configured to send an instruction to cause upload water treatment assembly 22 to pre-heat its UV radiation emitter when treatment of water is anticipated. For example, control module 44 may instruct upload water treatment assembly 22 to pre-heat its UV radiation emitter in response to the aircraft's parking break being activated.

Control module 44 is further communicatively coupled to a transmitter 47, which in turn is communicatively coupled to a water level sensor 46 positioned in water storage tank 10. Readings from water level sensor 46 are sent to transmitter 47 which transmits the readings to control module 44. Water level sensor 46 is configured to determine an amount of water contained in water storage tank 10. Once water level sensor 46 has determined an amount of water contained in water storage tank 10, the sensor reading is sent to transmitter 47 which transmits the reading to control module 44. In other embodiments, water level sensor 46 may be configured to communicate directly with control module 44, and/or control module 44 may obtain the water level readings from water level sensor 46 in an active manner, without requiring water level sensor 46 to transmit the water level readings.

In some embodiments, a flow meter 48 (positioned upstream of overflow valve 24, in FIG. 1) is also used to determine an amount of water contained in water storage tank 10. In particular, flow meter 48 may be used to measure a rate of water flow into water storage tank 10 during resupply. The initial amount of water contained in water storage tank 10 will be known from a reading taken by water level sensor 46. During resupply, the accuracy of the readings taken by water level sensor 46 may decrease (for example due to splashing as water enters water storage tank 10). Thus, the rate of flow of water into water storage tank 10, as determined by flow meter 48, may be taken into consideration and combined with the initial water level reading in order to determine an amount of water contained in water storage tank 10.

Figure 2:
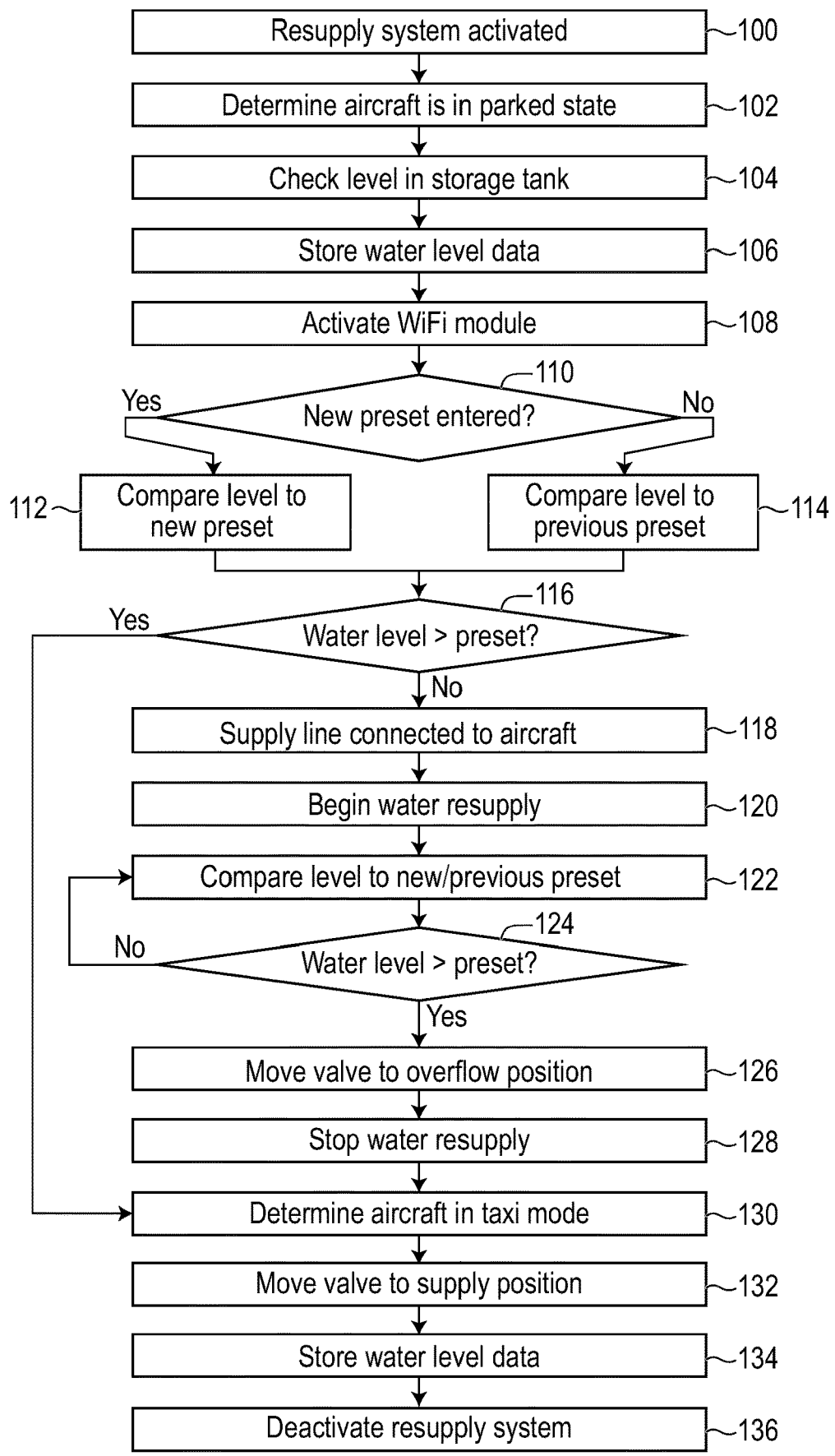
FIG. 2 is a flowchart showing a method for supplying water to an aircraft, in accordance with an embodiment of the disclosure.

A method for supplying water to an aircraft will now be described, with reference to FIGS. 1 and 2. FIG. 2 shows a flowchart of an exemplary method that may be used by the resupply system of FIG. 1. Note that in other embodiments, more or fewer blocks/operations may be used in the method, and the order of the blocks/operations may also be modified without departing from the scope of the disclosure.

The method begins at block 100 wherein resupply system 10 is activated. Resupply system 10 may be activated in response to control module 44 receiving a sensor signal from a weight-on-wheels sensor (WoW sensor). As known in the art, a WoW sensor determines when the aircraft undercarriage is in contact with the ground by detecting a weight applied to the undercarriage. The WoW sensor is communicative with control module 44 which, in response to receiving a signal indicative of the aircraft's touchdown, activates resupply system 10.

At block 102, control module 44 determines that the aircraft is in a parked state. For example, control module 44 may determine that the aircraft's parking brake has been engaged. Other means of determining that the aircraft is in a parked state are contemplated.

In response to determining that the aircraft is in a parked state, at block 104 control module 44 requests from transmitter 47 for a reading of the water level contained in water storage tank 10, as measured by water level sensor 46. At block 106, the reading is stored in aircraft data database 42. Blocks 104 and 106 may loop continuously until, for example, the resupply system is deactivated. For instance, control module 44 may request water level readings at periodic intervals, for example every second, and each reading may be stored in aircraft data database 42. At block 108, a WiFi module associated with communications system 36 is activated. The aircraft crew may then access, via the WiFi network, aircraft data database 42 to ascertain the current amount of water in water storage tank 10.

At block 110, control module 44 determines whether a new storage tank fill preset has been entered. For example, a crew member, using display 40, may input to control module 44 an amount of water that is desired to be contained in water storage tank 10. The input may take various forms. For example, in one embodiment the crew member may specify a volume of water desired to be contained in water storage tank 10. In another embodiment, a crew member may input a percentage of the total volume of water storage tank 10 that they desire to have filled with water. For instance, the crew member may select 50% of water storage tank 10 to be filled with water, or 75% of water storage tank 10 to be filled with water. In other embodiments, the crew member may adjust the total volume of water desired to be contained in water storage tank 10 in increments of a preset number volume units, or a preset number of percentages.

If control module 44 determines that a new fill preset has been entered, then, at block 112, control module 44 compares the amount of water contained in water storage tank 10 (the value of which is periodically communicated to control module 44 by transmitter 47, as discussed above) to the new fill preset. If control module 44 determines that no new fill preset has been entered, then, at block 114, control module 44 compares the amount of water contained in water storage tank 10 (the value of which is periodically communicated to control module 44 by transmitter 47, as discussed above) to a previous fill preset. In one embodiment, the previous fill preset may be the last fill preset entered via display 40.

In either case, at block 116, control module 44 determines whether the amount of water contained in water storage tank 10 is greater than the fill preset. If so, then the amount of water contained in water storage tank 10 is already greater than that desired for the aircraft's subsequent flight and there is no need to proceed with the resupply. Accordingly, the process moves to block 130. If the amount of water contained in water storage tank 10 is less than the fill preset, then the process moves to block 118. At block 118, the ground crew connect supply line 16 between potable water service panel 20 and water supply tank 14. At block 120, pump 18 is then activated and water is pumped from water supply tank 14 to water storage tank 10, via supply line 16. As water flows through supply line 16, it is treated by upload water treatment assembly 22 so as to be substantially potable and suitable for use by passengers and crew. During resupply, overflow valve 24 is in the first, resupply position so as to allow water to flow to water storage tank 10 and prevent water from flowing along overflow line 26.

During resupply, at block 122 the current level of water in water storage tank 10 is compared to the new/previous fill preset (as appropriate). If the current level of water is less than the new/previous fill preset, then the process repeats at block 122. If the current level of water is greater than the new/previous fill preset, then the process moves from block 124 to block 126 at which control 44 transmits an instruction to cause overflow valve 24 to move from the resupply position to the overflow position. For example, control module 44 may issue an instruction to cause a motor to move overflow valve 24 from the resupply position to the overflow position. In the overflow position, water flowing along supply line 16 is prevented from flowing to water storage water tank 10 and instead is diverted to overflow line 26. The overflow water then exits the aircraft via overboard dump port 28, which may be a drain mast of the aircraft.

Upon observing the egress of water from overboard dump port 28, at block 128, the ground crew deactivate pump 18 to cease resupply of water to the aircraft. Furthermore, supply line 16 is disconnected from potable water service panel 20. The ground crew need not be aware of how much water has been supplied to the aircraft. In particular, the activation of overflow valve 24, in response to control module 44 determining that the amount of water in water storage tank 10 has reached the fill preset, is automatic. Thus, no additional training of the ground crew is required.

Once aircraft is ready for takeoff, at block 130, control module 44 determines that the aircraft is in a pre-takeoff taxi mode. For example, control module 44 may determine that the aircraft's parking brake has been disengaged. Other means of determining that the aircraft is in a taxi mode are contemplated. At block 132, control module 44 instructs overflow valve 24 to return to the resupply position, in preparation for the subsequent resupply following the aircraft's next flight. At block 134, control module stored the current water level in aircraft data database 42. At block 136, the resupply system is deactivated. For example, control module 44 may enter a sleep mode to conserve power.

In some embodiments, control module 44 may continuously check to see whether one or more new fill presets have been entered. If a new fill preset is entered which is greater than the previous fill preset, and if overflow valve 24 has already been moved to the overflow position, then control module 44 will instruct overflow valve 24 to return to the resupply position so as to allow water to flow to water storage tank 10. For example, if the crew initially indicated to control module 44 that 50% of water storage tank 10 is required to be filled, but then increase the fill preset to 75%, then control module 44 will take into account the new fill preset during resupply.

In some embodiments, the fill preset may be automatically determined by control module 44. For example, the control module 44 may access aircraft data database 42 to obtain details of the aircraft's next upcoming flight (distance, expected passenger capacity, etc.). Based on this data, which may be supplemented with historical data from previous flights, control module 44 may estimate the amount of water, and a corresponding fill preset, that is required for the next flight. In other embodiments, the fill preset may be automatically determined by a flight computer external to control module 44, and the fill preset may be automatically sent to control module 44 by the flight computer. The crew may adjust the fill preset as they see fit.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

What is claimed is:

1. A method for supplying water to an aircraft, comprising:
    determining a desired amount of water to be contained in a water storage tank onboard an aircraft;
    supplying water via a supply line to the water storage tank, wherein supplying water to the water storage tank comprises supplying water to the water storage tank from a water supply assembly comprising a water supply tank and the supply line;
    determining that an amount of water contained in the water storage tank corresponds to the desired amount of water;
    in response to determining that the amount of water contained in the water storage tank corresponds to the desired amount of water, diverting the supply of water away from the water storage tank and to an overflow line, wherein diverting the supply of water comprises activating an overflow valve fluidly coupling the water supply assembly and the overflow line, and wherein diverting the supply of water further comprises moving the overflow valve from a first position, in which water is prevented from flowing between the water supply assembly and the overflow line, to a second position in which water is prevented from flowing between the water supply assembly and the water storage tank;
    determining that the aircraft is in a pre-takeoff taxi mode; and
    in response to determining that the aircraft is in the pre-takeoff taxi mode, moving the overflow valve from the second position to the first position.

2. The method of claim 1, further comprising, prior to determining the desired amount of water to be contained in the water storage tank, receiving a selection of the desired amount of water to be received in the water storage tank.

3. The method of claim 2, wherein receiving the selection comprises receiving a selection of a volume of water to be contained in the water storage tank.

4. The method of claim 2, wherein receiving the selection comprises receiving: a selection of a percentage of a volume of the water storage tank to be filled with water; or a selection of a volume of water to be supplied to the water storage tank.

5. The method of claim 1, wherein determining that the aircraft is in the pre-takeoff taxi mode comprises determining that a parking brake of the aircraft is deactivated.

6. The method of claim 1, further comprising:
    prior to determining the desired amount of water to be contained in the water storage tank, determining that the aircraft is in a parked mode.

7. The method of claim 6, wherein determining the aircraft is in the parked mode comprises determining that a parking brake of the aircraft is activated.

8. The method of claim 1, wherein diverting the supply of water comprises diverting the supply of water away from the water storage tank and to a drain mast of the aircraft, via the overflow line.

9. The method of claim 1, wherein determining the desired amount of water to be contained in the water storage tank comprises using historical water consumption data.

10. The method of claim 1, further comprising treating the water at one or more points in the supply line.

11. The method of claim 1, wherein determining that the amount of water in the water storage tank corresponds to the desired amount of water comprises using one or more of: a water level sensor for determining an amount of water contained in the water storage tank; and a flow meter for determining a rate of flow of water into the water storage tank.

12. The method of claim 1, wherein the overflow valve comprises a motorized valve.

* * * * *